United States Patent
Lee et al.

(10) Patent No.: US 11,440,554 B2
(45) Date of Patent: Sep. 13, 2022

(54) METHOD AND SYSTEM FOR DETERMINING DRIVER EMOTIONS IN CONJUCTION WITH DRIVING ENVIRONMENT

(71) Applicants: HYUNDAI MOTOR COMPANY, Seoul (KR); KIA MOTORS CORPORATION, Seoul (KR)

(72) Inventors: Jin Mo Lee, Uiwang-si (KR); Young Bin Min, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 38 days.

(21) Appl. No.: 17/084,041

(22) Filed: Oct. 29, 2020

(65) Prior Publication Data
US 2022/0032919 A1  Feb. 3, 2022

(30) Foreign Application Priority Data

Jul. 29, 2020 (KR) .......................... 10-2020-0094531

(51) Int. Cl.
*B60W 40/08* (2012.01)
*G10L 25/63* (2013.01)
*B60W 40/02* (2006.01)

(52) U.S. Cl.
CPC ............ *B60W 40/08* (2013.01); *B60W 40/02* (2013.01); *G10L 25/63* (2013.01); *B60W 2540/21* (2020.02); *B60W 2540/22* (2013.01)

(58) Field of Classification Search
CPC .. B60W 40/02; B60W 40/08; B60W 2540/21; B60W 2540/22
See application file for complete search history.

(56) References Cited

U.S. PATENT DOCUMENTS

| | | | |
|---|---|---|---|
| 2014/0277888 A1* | 9/2014 | Dastoor | B60L 50/51 701/22 |
| 2019/0176845 A1* | 6/2019 | Yoon | G06V 20/59 |
| 2019/0276036 A1 | 9/2019 | Noguchi et al. | |
| 2019/0351912 A1* | 11/2019 | Woo | B60H 1/00964 |
| 2021/0287697 A1* | 9/2021 | Marti | B60W 40/08 |

FOREIGN PATENT DOCUMENTS

| | | |
|---|---|---|
| JP | 6648304 B2 | 2/2020 |
| KR | 10-1901417 B1 | 9/2018 |

* cited by examiner

*Primary Examiner* — Andrew W Bee
(74) *Attorney, Agent, or Firm* — Morgan, Lewis & Bockius LLP

(57) ABSTRACT

A method of determining driver emotions in conjunction with a driving environment includes determining a basic emotion of a driver, acquiring driving environment information, determining the driver emotion based on the driving environment information and the basic emotion, and providing a service of displaying the driver emotion or a driver-emotion-based service.

25 Claims, 7 Drawing Sheets

METHOD AND SYSTEM FOR DETERMINING DRIVER EMOTIONS IN CONJUCTION WITH DRIVING ENVIRONMENT

This application claims the benefit of Korean Patent Application No. 10-2020-0094531, filed on Jul. 29, 2020, which is hereby incorporated by reference as if fully set forth herein.

TECHNICAL FIELD

The present disclosure relates to a method and system for determining driver emotions in conjunction with a driving environment.

BACKGROUND

Global life paradigm has brought about the advent of professional technology that functions as helpers for humans in order to improve the quality of life. In particular, there has been a need for vehicle technology to ensure safe and convenient driving environments in various vehicles, which are necessities in modern life, but to date there remains a need for innovative vehicle technology that provides a new concept for an emotional and safe driving function based on emotion recognition.

A conventional driver emotion classification system provides a service appropriate for a driver using information on the emotional state of the driver and other information, recognizes a skilled level of the driver using information on the driving environment and information on the emotions of the driver, and changes a setting value of a vehicle control device based on the recognized skill.

In contrast, there has been a need for technology for classifying the emotions of a driver in detail using information on primarily classified emotions of a driver and information on the driving environment of a vehicle at the time of emotional change as technology for more accurately recognizing the emotional state of the driver.

SUMMARY

Accordingly, the present disclosure is directed to a method and system for determining driver emotions in conjunction with a driving environment for classifying driver emotions in detail using driver emotion information and driving environment information of a vehicle at the time at which the emotion changes.

The technical problems solved by the embodiments are not limited to the above technical problems and other technical problems which are not described herein will become apparent to those skilled in the art from the following description.

To achieve these objects and other advantages and in accordance with the purpose of the disclosure, as embodied and broadly described herein, a method of determining driver emotions in conjunction with a driving environment includes determining a basic emotion of a driver, acquiring driving environment information, determining the driver emotion based on the driving environment information and the basic emotion, and providing a service of displaying the driver emotion or a driver-emotion-based service.

In some embodiments, the driving environment information may include at least one of a vehicle speed, an acceleration, global positioning system (GPS) information, passenger riding information, voice utterance information, or information device manipulation information.

In some embodiments, the determining the driver emotion may include simultaneously receiving the basic emotion and the driving environment information, which are generated in real time, and recognizing whether the driver emotion occurs, and matching the basic emotion and the driving environment information with each other according to a preset matching table and determining whether a preset driver emotion occurs.

In some embodiments, the method may further include determining positive and negative levels of the basic emotion.

In some embodiments, the determining the driver emotion may include, when the basic emotion is a positive emotion, determining that the basic emotion is the driver emotion while traveling, and when the basic emotion is a negative emotion, classifying the basic emotion into a subdivided negative emotion based on the negative emotion and the driving environment information.

In some embodiments, the method may further include detecting a driving environment event, and when the detected driving environment event indicates an emotion-associated event, activating a basic emotion recognition system.

In some embodiments, the method may further include, after the basic emotion recognition system is activated, determining whether the basic emotion occurs within a threshold time.

In some embodiments, the method may further include, when the basic emotion does not occur within the threshold time, deactivating the basic emotion recognition system, and when the basic emotion occurs within the threshold time, determining the driver emotion based on the driving environment information and the basic emotion.

In some embodiments, when the driving environment event is detected, the activating the basic emotion recognition system may include classifying a type of the driving environment event into an event that induces a change in emotion and an event that takes time to induce a change in emotion and changing a time of activating the emotion recognition system.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the exemplary embodiments of the present disclosure, examples of which are illustrated in the accompanying drawings. The suffixes "module" and "unit" of elements herein are used for convenience of description and thus can be used interchangeably and do not have any distinguishable meanings or functions.

In description of exemplary embodiments, it will be understood that, when an element is referred to as being "on" or "under" and "before" or "after" another element, the element can be directly on another element or intervening elements may be present.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

The terms "comprises", "includes", and "has" described herein should be interpreted not to exclude other elements but to further include such other elements since the corresponding elements may be included unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless differently defined in the present disclosure, such terms should not be interpreted in an ideal or excessively formal manner.

Figure 1:
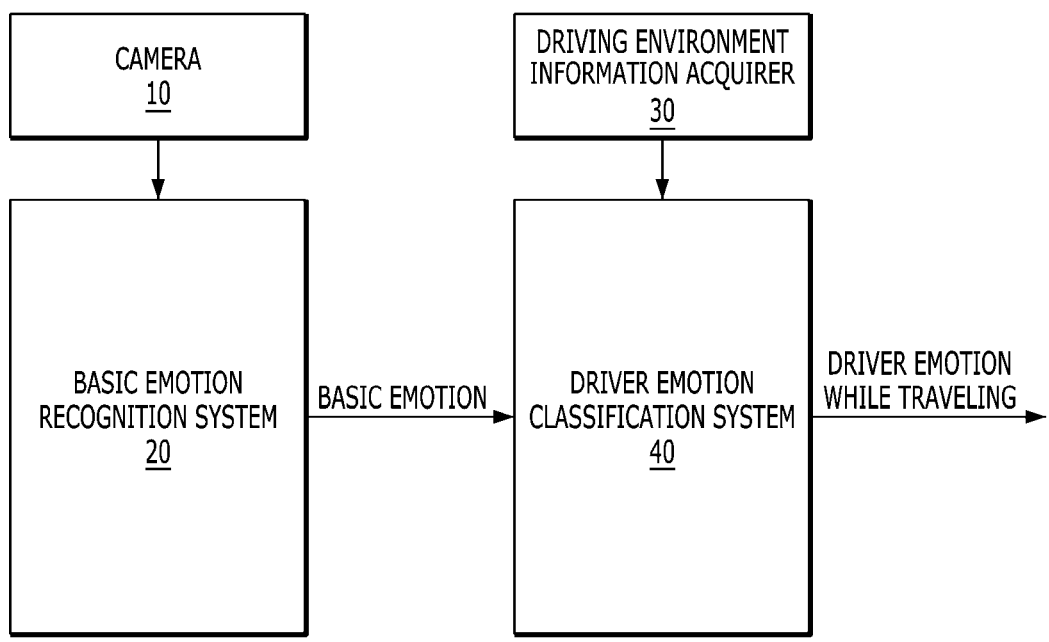
FIG. 1 is a block diagram of a system for determining driver emotions in conjunction with a driving environment according to an embodiment of the present disclosure.

FIG. 1 is a block diagram of a system for determining driver emotions in conjunction with a driving environment according to an embodiment of the present disclosure.

Referring to FIG. 1, the system for determining driver emotions in conjunction with a driving environment may include a camera 10, a basic emotion recognition system 20, a driving environment information acquirer 30, and a driver emotion classification system 40.

The camera 10 including an image sensor may be disposed in a vehicle and may acquire an image of the face of a driver.

The basic emotion recognition system 20 may include a preprocessing module, a feature extraction module, and an emotion classification module.

The preprocessing module may correct image quality and may remove noise through preprocessing of raw data acquired through the camera 10.

The feature extraction module may detect a feature point such as emotion or movement from an input image.

The feature extraction may be performed using a holistic method of detecting a feature by modeling or expressing the intensity of pixels values in an image of the entire face, a geometrical approach method of detecting a feature by searching for the geometrical arrangement and position of features in the face, and an active appearance model (AAM), formed by combining the holistic method and the geometrical approach method.

The emotion classification module may classify the state of a given image based on classification of patterns of the detected feature.

The emotion classification module may classify emotions using a method of a Bayesian network using a predefined conditional probability, a K-nearest neighbor algorithm, an artificial neural network, or the like.

The basic emotion recognition system 20 may repeatedly classify a pattern of an image classified through post-processing in multiple stages, and may output the finally selected result as the determination result.

The driver emotion classification system 40 may classify the basic emotion of a driver using driving information and the result of recognition of a basic emotion. The driver emotion classification system 40 will be described below in detail with reference to FIGS. 2 to 4.

The driving environment information acquirer 30 may include a sensor configured to determine a speed of the vehicle, a sensor such as an inertial sensor configured to determine an acceleration of the vehicle, a global positioning system (GPS) configured to obtain GPS information of the vehicle, a sensor configured to obtain passenger riding information, a microphone with voice recognition configured to obtain voice utterance information, or a user interface configured to receive manipulation information input by the driver or passenger. In this regard, driving environment information may include at least one of a vehicle speed, an acceleration, global positioning system (GPS) information, passenger riding information, voice utterance information, or information device manipulation information.

Figure 2:
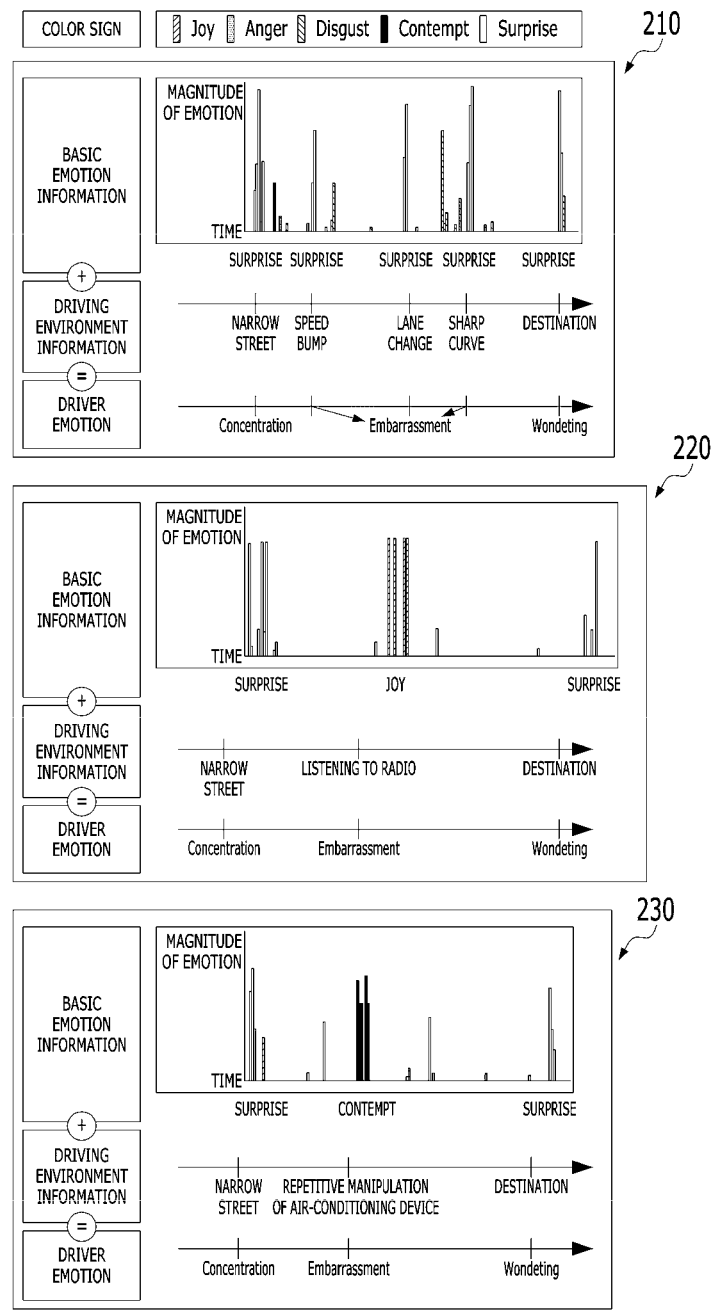
FIG. 2 is a diagram showing the result of emotion classification and extraction of the emotions of a driver according to an embodiment of the present disclosure.

FIG. 2 is a diagram showing the result of emotion classification and extraction of the emotions of a driver according to an embodiment of the present disclosure.

Referring to FIG. 2, first experimental data to third experimental data 210, 220, and 230 may be experimental data showing experimental results obtained by extracting emotions of the driver during actual driving. The system for determining driver emotions in conjunction with a driving environment may detect basic emotion using the camera 10 and the basic emotion recognition system 20 while a vehicle travels for a preset time, and may derive the emotion of the driver using the detected basic emotion and the driving environment information.

Referring to the first experimental data 210, upon detecting that basic emotion of surprise occurs several times, the driver emotion classification system 40 may subdivide the emotion of surprise into three types of emotion of the driver based on the driving environment information and may determine the emotion of the driver based thereon. Thus, when the driving environment information corresponds to the state of a narrow street, the driver emotion classification system 40 may determine the emotion of the driver as concentration.

Referring to the second experimental data 220, when detecting the basic emotion of joy, the driver emotion classification system 40 may subdivide the emotion of joy based on the driving environment information and may determine the emotion of the driver. Thus, when driving environment information corresponds to listening to a radio, the driver emotion classification system 40 may determine the emotion of the driver as excitement.

Referring to the third experimental data 230, when detecting the basic emotion of contempt, the driver emotion classification system 40 may subdivide the emotion of contempt based on the driving environment information and may determine the emotion of the driver. Thus, when the driving environment information corresponds to repetitive manipulation of an air-conditioning device, the driver emotion classification system 40 may determine the emotion of the driver as discontent.

Figure 3:
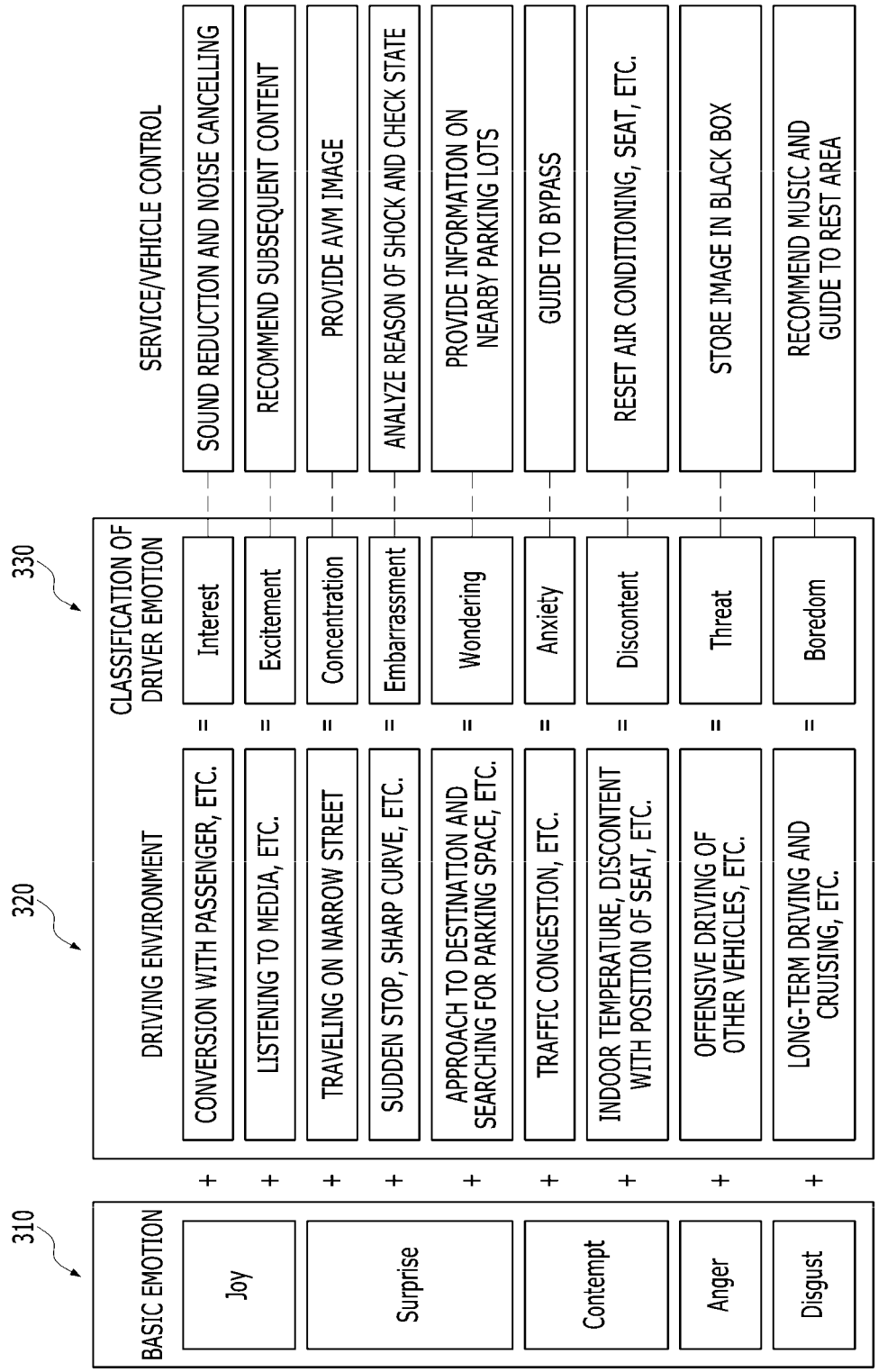
FIG. 3 is a diagram showing a vehicle service and vehicle control corresponding to the emotions of a driver according to a first embodiment of the present disclosure.

FIG. 3 is a diagram showing a vehicle service and vehicle control corresponding to the emotions of a driver according to a first embodiment of the present disclosure.

Referring to FIG. 3, the driver emotion classification system 40 may have preconfigured therein a specific driving environment event matched with a specific basic emotion. That is, the driver emotion classification system 40 may preset a detailed emotion formed as the intersection between the specific basic emotion and a specific driving environment according to a configuration.

When the basic emotion is contempt, if the driving environment information corresponds to traffic congestion, the driver emotion classification system 40 may determine the emotion of the driver as anxiety. Thus, the system for determining driver emotions in conjunction with a driving environment may perform guidance to a bypass.

However, when the basic emotion is anger, if the driving environment information corresponds to traffic congestion, the driver emotion classification system 40 may not determine the emotion of the driver as anxiety. Thus, the system for determining driver emotions in conjunction with a driving environment may not perform vehicle control and service provision.

When the basic emotion is surprise, if the driving environment information corresponds to traffic congestion, the driver emotion classification system 40 may not determine the emotion of the driver as anxiety. Accordingly, the system for determining driver emotions in conjunction with a driving environment may not perform vehicle control and service provision.

When the basic emotion is joy, if the driving environment information corresponds to traffic congestion, the driver emotion classification system 40 may not determine the emotion of the driver as anxiety. Accordingly, the system for determining driver emotions in conjunction with a driving environment may not perform vehicle control and service provision.

When the basic emotion is contempt, if the driving environment information does not correspond to traffic congestion, the driver emotion classification system 40 may not determine the emotion of the driver as anxiety. Accordingly, the system for determining driver emotions in conjunction with a driving environment may not perform vehicle control and service provision.

The driver emotion classification system 40 may determine that a specific 'driver emotion' occurs only when both the basic emotion and the driving environment event occur according to a configured matching table. In this case, the driver emotion classification system 40 may simultaneously receive a 'basic emotion' and 'driving environment information' that occur in real time, and may recognize whether an emotion of the driver occurs.

Figure 4:
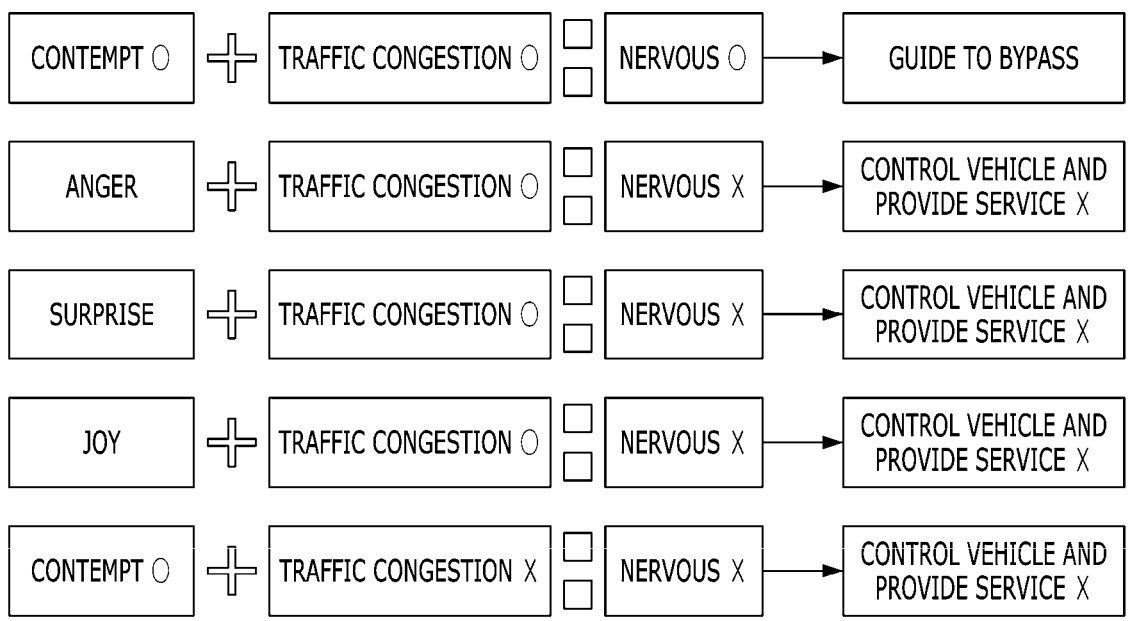
FIG. 4 is a diagram showing a driver-emotion-based service according to a first embodiment of the present disclosure.

FIG. 4 is a diagram showing a driver-emotion-based service according to a first embodiment of the present disclosure.

Referring to FIG. 4, the driver emotion classification system 40 may classify a driver emotion 330 based on basic emotion information 310 from the basic emotion recognition system 20 and driving environment information 320 acquired in real time from the driving environment information acquirer 30.

A driver frequently experiences the basic emotion of surprise while traveling, and thus a driver emotion recognition system needs to be designed to subdivide the emotion of surprise, and it is important to recognize a negative emotion of the driver in the interests of the safety of the driver, and thus it is required to design the system so as to subdivide the negative emotion (surprise, contempt, anger, or disgust).

When the basic emotion is joy, if the driving environment information corresponds to conversation with a passenger, the driver emotion classification system 40 may determine the emotion of the driver as interest. Accordingly, the system for determining driver emotions in conjunction with a driving environment may perform sound reduction and noise cancelling according to service and vehicle control.

When the basic emotion is joy, if the driving environment information corresponds to listening to media, the driver emotion classification system 40 may determine the emotion of the driver as excitement. Accordingly, the system for determining driver emotions in conjunction with a driving environment may recommend subsequent content according to service and vehicle control.

When the basic emotion is surprise, if the driving environment information indicates traveling on a narrow street, the driver emotion classification system 40 may determine the emotion of the driver as concentration. Accordingly, the system for determining driver emotions in conjunction with a driving environment may provide an AVM image according to service and vehicle control.

When the basic emotion is surprise, if the driving environment information indicates approach to a destination and searching for a parking space, the driver emotion classification system 40 may determine the emotion of the driver as wondering. Accordingly, the system for determining driver emotions in conjunction with a driving environment may provide information on a nearby parking lot according to service and vehicle control.

When the basic emotion is surprise, if the driving environment information indicates approach to a destination and searching for a parking space, the driver emotion classification system 40 may determine the emotion of the driver as wondering. Accordingly, the system for determining driver emotions in conjunction with a driving environment may provide information on nearby parking lots according to service and vehicle control.

When the basic emotion is contempt, if the driving environment information indicates traffic congestion, the driver emotion classification system 40 may determine the driver emotion as anxiety. Accordingly, the system for determining the driver emotions in conjunction with a driving environment may perform guidance to a bypass according to service and vehicle control.

When the basic emotion is contempt, if the driving environment information indicates indoor temperature, discontent with the position of a seat, or the like, the driver emotion classification system 40 may determine as discontent. Accordingly, the system for determining driver emotions in conjunction with a driving environment may perform resetting of air conditioning or a seat according to service and vehicle control.

When the basic emotion is anger, if the driving environment information indicates offensive driving of other vehicles, the driver emotion classification system 40 may determine the driver emotion as threatened. Accordingly, the system for determining driver emotions in conjunction with a driving environment may store an image in a black box according to service and vehicle control.

When the basic emotion is disgust, if the driving environment information indicates long-term driving and cruising, the driver emotion classification system 40 may determine the driver emotion as boredom. Accordingly, the system for determining driver emotions in conjunction with a driving environment may recommend music and perform guidance to a rest area according to service and vehicle control.

Figure 5:
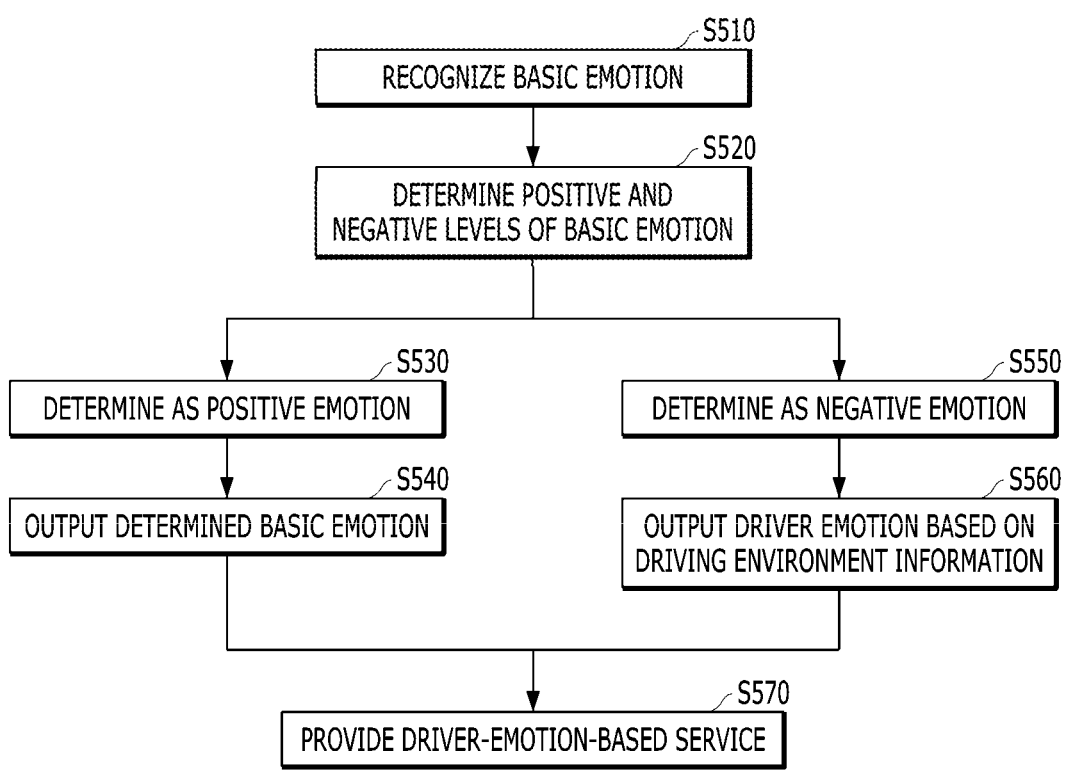
FIG. 5 is a diagram showing a method of determining driver emotions in conjunction with a driving environment according to a first embodiment of the present disclosure.

FIG. 5 is a diagram showing a method of determining driver emotions in conjunction with a driving environment according to a first embodiment of the present disclosure.

Referring to FIG. 5, the system for determining driver emotions in conjunction with a driving environment may recognize basic emotions based on an image of a driver, input through the camera 10 (S510).

After operation S510, the driver emotion classification system 40 may determine positive and negative levels of the basic emotion (S520).

After operation S520, when the basic emotion is determined as a positive emotion (S530), the driver emotion classification system 40 may output the determined basic emotion as a driver emotion while traveling (S540). Accordingly, when the basic emotion is a positive emotion, the driver emotion classification system 40 may apply a weight to the basic emotion and may classify the driver emotion.

After operation S540, the system for determining driver emotions in conjunction with a driving environment may provide a service for displaying the driver emotion or a driver-emotion-based service (S570).

After operation S520, upon determining that the basic emotion is a negative emotion (S550), the driver emotion classification system 40 may output a driver emotion based on the driving environment information (S560). Thus, when the basic emotion is a negative emotion, the driver emotion classification system 40 may apply a weight to a driving environment and may classify the driver emotion. In this case, the detailed emotion matched with the driving environment that induces the negative emotion may be configured in advance. For example, when the driving environment indicates traffic congestion, the driver emotion may be matched with anxiety, when the driving environment indicates a sudden stop, the driver emotion may be matched with embarrassment, and when the driving environment indicates cruising, the driver emotion may be matched with boredom.

After operation S560, the system for determining driver emotions in conjunction with a driving environment may provide a service of displaying the driver emotion or a driver-emotion-based service (S570).

Figure 6:
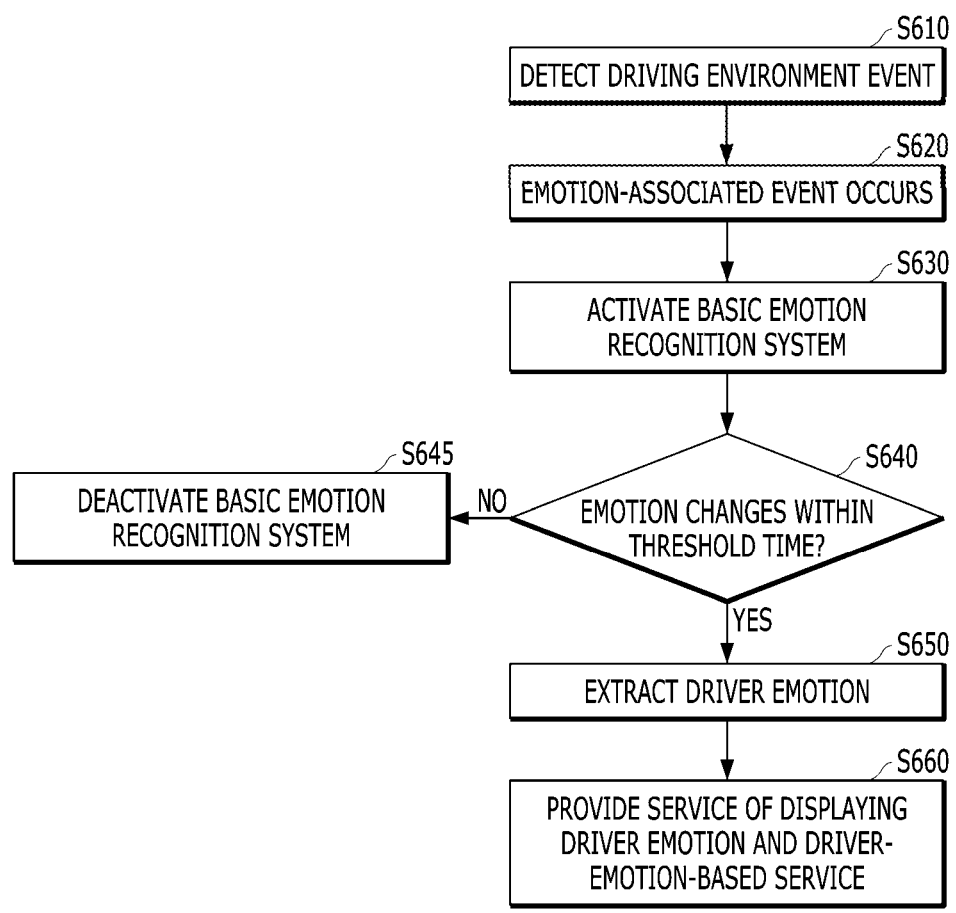
FIG. 6 is a diagram showing a method of determining driver emotions in conjunction with a driving environment according to a second embodiment of the present disclosure.

FIG. 6 is a diagram showing a method of determining driver emotions in conjunction with a driving environment according to a second embodiment of the present disclosure.

Referring to FIG. 6, the system for determining driver emotions in conjunction with a driving environment may detect a driving environment event (S610). As such, information on emotion may not be acquired for the entire driving time, but instead may be acquired in a situation predictable by a user.

After operation S610, a system for determining driver emotions in conjunction with a driving environment may generate an emotion-associated event (S620).

After operation S620, the basic emotion recognition system 20 may be activated. The basic emotion may be recognized through the activated basic emotion recognition system 20 (S630). That is, the emotion recognition system may be activated only when the driving environment event occurs.

After operation S630, the basic emotion recognition system 20 may determine whether an emotion changes within a preset threshold time (S640).

When the emotion does not change within the preset threshold time in operation S640, the basic emotion recognition system 20 may not be activated (S645).

When the emotion changes within the preset threshold time in operation S640, the driver emotion classification system 40 may recognize a driver emotion based on the driving environment information and the recognized basic emotion according to the driving environment event (S650).

After operation S650, the system for determining driver emotions in conjunction with a driving environment may provide a service for displaying the driver emotion or a driver-emotion-based service (S660).

Figure 7:
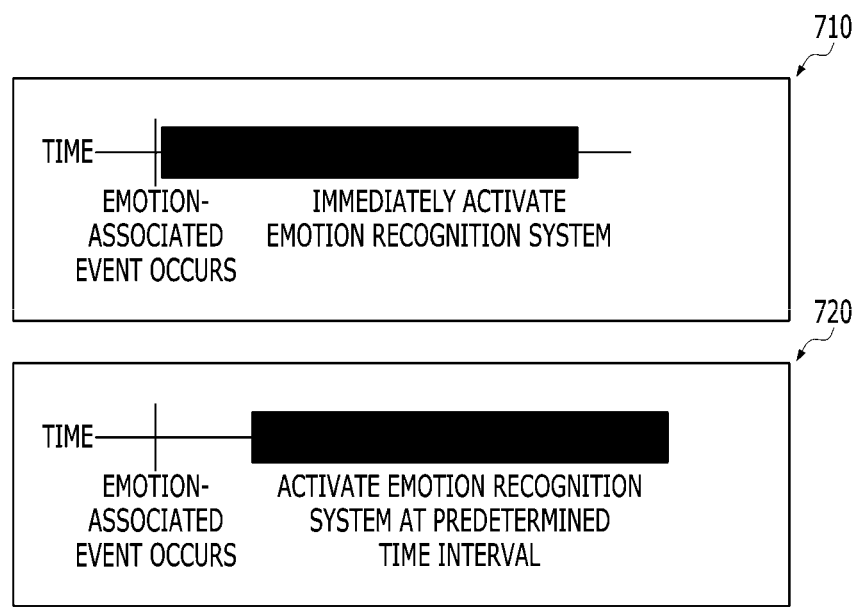
FIG. 7 is a diagram for explaining a method of determining driver emotions in conjunction with a driving environment according to a second embodiment of the present disclosure.

FIG. 7 is a diagram for explaining a method of determining driver emotions in conjunction with a driving environment according to a second embodiment of the present disclosure.

Referring to FIG. 7, the time at which an emotion recognition system is activated may be changed depending on the type of the driving environment event.

As shown in the drawing, when a surprise-related event such as sudden stop occurs at a first time 710 at which the emotion recognition system is activated, the system for determining driver emotions in conjunction with a driving environment may activate the emotion recognition system immediately when the emotion-associated event occurs.

As shown in the drawing, when a joy-related event such as listening to media occurs at a second time 720 at which the emotion recognition system is activated, the system for determining driver emotions in conjunction with the driving environment may activate the emotion recognition system after a preset time interval from the time at which the emotion-associated event occurs.

As such, the system for determining driver emotions in conjunction with a driving environment may differentiate an event that immediately induces a change in emotion and an event that takes time to induce a change in emotion, and may activate the emotion-recognition system at the time at which the emotion changes.

The method and system for determining driver emotions in conjunction with a driving environment according to the present disclosure may advantageously subdivide emotions that driver frequently experiences, and may apply classification of emotion specified to the driver.

Technology for activating an emotion-recognition system in conjunction with a driving environment may advantageously prevent vehicle computing capability from being wasted, and may protect the privacy of the driver.

It will be appreciated by persons skilled in the art that that the effects that could be achieved with the present disclosure are not limited to what has been particularly described hereinabove and other advantages of the present disclosure will be more clearly understood from the detailed description.

The aforementioned method according to an embodiment may be may be implemented as computer-readable code stored in a computer-readable recording medium included in a network device. The computer-readable recording medium includes all kinds of recording media storing data readable by a processor. Examples of the computer-readable recording medium include a ROM, a RAM, a CD-ROM, a magnetic tape, a floppy disk, an optical data storage device and the like, and implementation as carrier waves such as transmission over the Internet. In addition, the computer-readable recording medium may be distributed to computer systems connected through a network, stored and executed as code readable in a distributed manner. Also, functional programs, code, and code segments for accomplishing the present disclosure can be easily construed by programmers skilled in the art to which the present disclosure pertains. The basic emotion recognition system 20 and the driver emotion classification system 40 each, or together, or the system for determining driver emotions may be implemented as a computer, a processor, or a microprocessor. When the computer, the processor, or the microprocessor reads and executes the computer-readable code stored in the computer-readable recording medium, the computer, the processor, or the microprocessor may be configured to perform the above-described operations.

It will be apparent to those skilled in the art that various modifications and variations can be made in the present disclosure without departing from the spirit or scope of the embodiments. Thus, it is intended that the present disclosure cover the modifications and variations of the embodiment provided they come within the scope of the appended claims and their equivalents.

What is claimed is:

1. A method of determining driver emotions in conjunction with a driving environment, the method comprising:
    determining a basic emotion of a driver;
    acquiring driving environment information;
    determining the driver emotion based on the driving environment information and the basic emotion; and
    providing a service of displaying the driver emotion or a driver-emotion-based service,
    wherein the determining the driver emotion comprises:
        simultaneously receiving the basic emotion and the driving environment information, which are generated in real time, and recognizing whether the driver emotion occurs, and
        matching the basic emotion and the driving environment information with each other according to a preset matching table and determining whether a preset driver emotion occurs.

2. The method of claim 1, wherein the driving environment information comprises at least one of a vehicle speed, an acceleration, global positioning system (GPS) information, passenger riding information, voice utterance information, or information device manipulation information.

3. The method of claim 1, further comprising: determining positive and negative levels of the basic emotion.

4. The method of claim 3, wherein the determining the driver emotion
    when the basic emotion is a positive emotion, determining that the basic emotion is the driver emotion while traveling; and
    when the basic emotion is a negative emotion, classifying the basic emotion into a subdivided negative emotion based on the negative emotion and the driving environment information.

5. The method of claim 1, further comprising:
    detecting a driving environment event; and
    when the detected driving environment event indicates an emotion-associated event, activating a basic emotion recognition system.

6. The method of claim 5, further comprising: after the basic emotion recognition system is activated, determining whether the basic emotion occurs within a threshold time.

7. The method of claim 6, further comprising:
    when the basic emotion does not occur within the threshold time, deactivating the basic emotion recognition system; and
    when the basic emotion occurs within the threshold time, determining the driver emotion based on the driving environment information and the basic emotion.

8. The method of claim 5, wherein, when the driving environment event is detected, the activating the basic emotion recognition system comprises classifying a type of the driving environment event into an event that induces a change in emotion and an event that takes time to induce a change in emotion and changing a time of activating the emotion recognition system.

9. A non-transitory computer-readable recording medium having recorded thereon a program for executing the method of claim 1.

10. A system for determining driver emotions in conjunction with a driving environment, the system comprising:
    a camera;
    a basic emotion recognition system configured to classify a basic emotion of a driver using face recognition information of the camera;
    a driving environment information acquirer configured to acquire driving environment information; and
    a driver emotion classification system configured to classify the basic emotion of the driver using the driving information and a result of recognition of the basic emotion and to classify a driver emotion,
    wherein the system for determining driver emotions is configured to provide a service of displaying the driver emotion or a driver-emotion-based service,
    wherein the driver emotion classification system simultaneously receives the basic emotion and the driving environment information, which are generated in real time, and recognizes whether the driver emotion occurs, and matches the basic emotion and the driving environment information with each other according to a preset matching table and determines that a preset driver emotion occurs.

11. The system of claim 10, wherein the driving environment information comprises at least one of a vehicle speed, an acceleration, global positioning system (GPS) information, passenger riding information, voice utterance information, or information device manipulation information.

12. The system of claim 10, wherein the driver emotion classification system determines positive and negative levels of the basic emotion.

13. The system of claim 12, wherein, when the basic emotion is a positive emotion, the driver emotion classification system determines that the basic emotion is the driver emotion while traveling, and when the basic emotion is a negative emotion, the driver emotion classification system classifies the basic emotion into a subdivided negative emotion based on the negative emotion and the driving environment information.

14. The system of claim 10, wherein, when a driving environment event is detected, and when the detected driving environment event indicates an emotion-associated event, the basic emotion recognition system is activated.

15. The system of claim 14, wherein, after the basic emotion recognition system is activated, the basic emotion recognition system determines whether basic emotion occurs within a threshold time.

16. The system of claim 15, wherein, when the basic emotion does not occur within the threshold time, the basic emotion recognition system is deactivated, and when the basic emotion occurs within the threshold time, the driver emotion classification system determines the driver emotion based on the driving environment information and the basic emotion.

17. The system of claim 14, wherein, when the driving environment event is detected, if the basic emotion recognition system is activated, the system for determining driver emotions classifies a type of the driving environment event into an event that induces a change in emotion and an event that takes time to induce a change in emotion, and changes a time of activating the emotion recognition system.

18. A method of determining driver emotions in conjunction with a driving environment, the method comprising:
   determining a basic emotion of a driver;
   acquiring driving environment information;
   determining the driver emotion based on the driving environment information and the basic emotion;
   providing a service of displaying the driver emotion or a driver-emotion-based service;
   detecting a driving environment event; and
   when the detected driving environment event indicates an emotion-associated event, activating a basic emotion recognition system.

19. The method of claim 18, further comprising: after the basic emotion recognition system is activated, determining whether the basic emotion occurs within a threshold time.

20. The method of claim 19, further comprising:
   when the basic emotion does not occur within the threshold time, deactivating the basic emotion recognition system; and
   when the basic emotion occurs within the threshold time, determining the driver emotion based on the driving environment information and the basic emotion.

21. The method of claim 18, wherein, when the driving environment event is detected, the activating the basic emotion recognition system comprises classifying a type of the driving environment event into an event that induces a change in emotion and an event that takes time to induce a change in emotion and changing a time of activating the emotion recognition system.

22. A system for determining driver emotions in conjunction with a driving environment, the system comprising:
   a camera;
   a basic emotion recognition system configured to classify a basic emotion of a driver using face recognition information of the camera;
   a driving environment information acquirer configured to acquire driving environment information; and
   a driver emotion classification system configured to classify the basic emotion of the driver using the driving information and a result of recognition of the basic emotion and to classify a driver emotion,
   wherein the system for determining driver emotions is configured to provide a service of displaying the driver emotion or a driver-emotion-based service,
   wherein, when a driving environment event is detected, and when the detected driving environment event indicates an emotion-associated event, the basic emotion recognition system is activated.

23. The system of claim 22, wherein, after the basic emotion recognition system is activated, the basic emotion recognition system determines whether basic emotion occurs within a threshold time.

24. The system of claim 23, wherein, when the basic emotion does not occur within the threshold time, the basic emotion recognition system is deactivated, and when the basic emotion occurs within the threshold time, the driver emotion classification system determines the driver emotion based on the driving environment information and the basic emotion.

25. The system of claim 22, wherein, when the driving environment event is detected, if the basic emotion recognition system is activated, the system for determining driver emotions classifies a type of the driving environment event into an event that induces a change in emotion and an event that takes time to induce a change in emotion, and changes a time of activating the emotion recognition system.

* * * * *